United States Patent
Liu et al.

(10) Patent No.: US 12,047,201 B2
(45) Date of Patent: *Jul. 23, 2024

(54) BINDING AND CONFIGURATION METHOD FOR BUS ADAPTER AND CHANNEL, BUS ADAPTER AND CONNECTION SYSTEM

(71) Applicant: Shanghai TOSUN Technology Ltd., Shanghai (CN)

(72) Inventors: Chu Liu, Shanghai (CN); Yueyin Xie, Shanghai (CN); Mang Mo, Shanghai (CN)

(73) Assignee: Shanghai TOSUN Technology Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,061

(22) Filed: Jul. 18, 2023

(65) Prior Publication Data
US 2023/0362030 A1    Nov. 9, 2023

Related U.S. Application Data

(63) Continuation of application No. 17/882,583, filed on Aug. 7, 2022, now Pat. No. 11,757,677, which is a (Continued)

(30) Foreign Application Priority Data

Aug. 2, 2021 (CN) .......................... 202110878601.2

(51) Int. Cl.
H04L 12/40 (2006.01)

(52) U.S. Cl.
CPC .. *H04L 12/40169* (2013.01); *H04L 12/40006* (2013.01)

(58) Field of Classification Search
None
See application file for complete search history.

(56) References Cited

U.S. PATENT DOCUMENTS 4,188,662 A * 2/1980 Ishibashi ............. G06F 12/0292
711/207
5,761,448 A 6/1998 Adamson et al.
(Continued)

FOREIGN PATENT DOCUMENTS

CN 101420459 A 4/2009
CN 112415943 A 2/2021
(Continued)

*Primary Examiner* — Benjamin Lamont
(74) *Attorney, Agent, or Firm* — Bayramoglu Law Offices LLC

(57) ABSTRACT

A binding and configuration method for a bus adapter and a channel, a bus adapter, and a connection system are provided. The method includes: configuring a mapping table of a mapping manager; associating a logical channel with a corresponding hardware channel based on the mapping table; and connecting the logical channel to the corresponding hardware channel for data communication. A common architecture for the application program to access bus adapter resources is realized. The application programs using this architecture can arbitrarily configure the bus adapter model and the hardware channel that need to be connected, and the mapping relationship takes effect immediately after each configuration change without modifying the user's software.

18 Claims, 3 Drawing Sheets

Related U.S. Application Data continuation of application No. PCT/CN2022/108431, filed on Jul. 28, 2022.

(56) References Cited

U.S. PATENT DOCUMENTS

| | | | |
|---|---|---|---|
| 8,065,454 B1 | 11/2011 | Sonksen et al. | |
| 9,740,647 B1 | 8/2017 | Arroyo et al. | |
| 2004/0199701 A1* | 10/2004 | Eckmuller | H04L 25/028 |
| | | | 710/305 |
| 2005/0027904 A1* | 2/2005 | Khawand | H04L 69/32 |
| | | | 710/30 |
| 2006/0195619 A1 | 8/2006 | Arndt et al. | |
| 2007/0173959 A1 | 7/2007 | Chandhoke | |
| 2010/0146240 A1* | 6/2010 | Hu | H04L 41/0856 |
| | | | 711/202 |
| 2021/0263503 A1* | 8/2021 | Lei | G05B 19/4183 |

FOREIGN PATENT DOCUMENTS

| | | |
|---|---|---|
| CN | 112486863 A | 3/2021 |
| CN | 113612671 A | 11/2021 |
| JP | 2015230600 A | 12/2015 |
| JP | 2018036804 A | 3/2018 |
| WO | 2011070638 A1 | 6/2011 |

\* cited by examiner

Bus adapter A  SN: 000001

Bus adapter B SN: 000123

Bus adapter C  SN: 000456

...

Bus adapter N  SN: 000789

FIG. 3

Mapping table configuration module

Association module

Connection module

FIG. 4

BINDING AND CONFIGURATION METHOD FOR BUS ADAPTER AND CHANNEL, BUS ADAPTER AND CONNECTION SYSTEM

CROSS REFERENCE TO THE RELATED APPLICATIONS

This application is the continuation application of U.S. application Ser. No. 17/882,583 filed on Aug. 7, 2022; U.S. application Ser. No. 17/882,583 is the continuation application of International Application No. PCT/CN2022/108431, filed on Jul. 28, 2022, which is based upon and claims priority to Chinese Patent Application No. 202110878601.2, filed on Aug. 2, 2021, the entire contents of which are incorporated herein by reference.

TECHNICAL FIELD

The present disclosure relates to the technical field of automotive bus adapters, and specifically, to a binding and configuration method for a bus adapter and a channel, a mapping manager, and a connection system.

BACKGROUND

Automotive bus adapters consist of a device with a USB interface atone end and single or multiple external automotive bus interfaces (CAN bus, LIN bus, FlexRay bus, automotive Ethernet, or the like) at the other end. Currently, there are various automotive bus adapters in the prior art from different manufacturers. The automotive bus adapter needs to be accompanied by a user-developed host computer application program for monitoring the automotive buses. The host computer application program is usually connected to multiple automotive bus adapters to access multiple buses simultaneously. In an application process, the existing technical solutions usually hard-code the to-be-connected automotive bus adapter in the software.

In an application process, since the existing technical solutions hard-code the to-be-connected automotive bus adapter in the software, there are two problems as follows:

First, when an automotive bus adapter A is replaced with an automotive bus adapter B, the corresponding software also needs to be changed to replace the connection code of the automotive bus adapter A with that of the automotive bus adapter B, which requires additional software modification time. If the automotive bus adapter B is replaced with the automotive bus adapter A later, the software needs to be modified again. Some users try to adopt a method that supports both the automotive bus adapter A and the automotive bus adapter B to facilitate switching between the adapters through configuration, but this method has the problem of being incompatible with an automotive bus adapter C.

Second, if the software is connected to two automotive bus adapters A and B of the same type, it is difficult for the software to distinguish between A and B when A is inserted into the computer device first and then B is inserted into the computer device, or when B is inserted into the computer device first and then A is inserted into the computer device. Even if the user binds A and B by reading serial numbers of the automotive bus adapters, it is also difficult to automatically identify the bus adapter after A is replaced by C in a subsequent application process.

Such problems eventually need to be resolved by modifying the software, which causes problems such as increased workload and decreased software reliability.

Therefore, to resolve the above technical problems, it is desirable to design a new binding and configuration method for a bus adapter and a channel, a mapping manager, and a connection system.

SUMMARY

The purpose of the present disclosure is to provide a binding and configuration method for a bus adapter and a channel, a mapping manager, a connection method for a bus adapter and a computer device, a binding and configuration system for a bus adapter and a channel, a bus adapter connection system, and a bus adapter.

The beneficial effects of the present disclosure include: In the present disclosure, a mapping table of a mapping manager is configured, a logical channel is associated with a corresponding hardware channel based on the mapping table, and the logical channel is connected to the corresponding hardware channel for data communication. A common architecture for the application program to access bus adapter resources is realized. The application programs using this architecture can arbitrarily configure the bus adapter model and the hardware channel that need to be connected, and the mapping relationship takes effect immediately after each configuration change without modifying the user's software, thus improving the efficiency of the application program development and reducing the possibility of errors.

Other features and advantages of the present disclosure will be described in the following description, and some of these will become apparent from the description or be understood by implementing the present disclosure. The objectives and other advantages of the present disclosure can be implemented or obtained by structures specifically indicated in the description and accompanying drawings.

To make the above purposes, features, and advantages of the present disclosure clearer and more understandable, the present disclosure is described in detail below using preferred examples with reference to the accompanying drawings.

BRIEF DESCRIPTION OF THE DRAWINGS

To describe the technical solutions in the specific implementations of the present disclosure or the prior art more clearly, the accompanying drawings required for describing the specific implementations or the prior art are briefly described below. It will become apparent that the accompanying drawings in the following description show merely some implementations of the present disclosure, and a person of ordinary skill in the art may still derive other drawings from these accompanying drawings without creative efforts.

FIG. 3 is a schematic diagram of a hardware index sorting method of bus adapters according to the present disclosure;

FIG. 4 is a principle block diagram of a binding and configuration system for a bus adapter and a channel according to the present disclosure.

DETAILED DESCRIPTION OF THE EMBODIMENTS

To make the objectives, technical solutions, and advantages of the examples of the present disclosure clearer, the technical solutions in the present disclosure are described clearly and completely below with reference to the accompanying drawings. It will become apparent that the described examples are some, rather than all of the examples. All other examples obtained by a person of ordinary skill in the art based on the examples of the present disclosure without creative efforts shall fall within the protection scope of the present disclosure.

Embodiment 1

Figure 1:
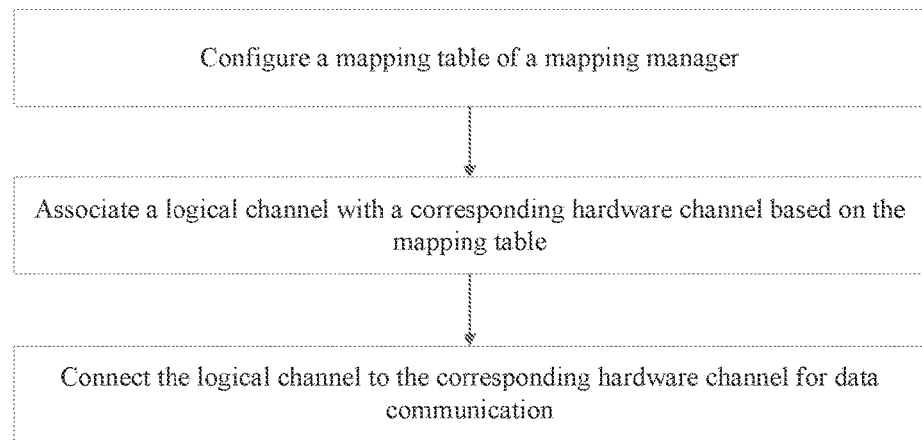
FIG. 1 is a flowchart of a binding and configuration method for a bus adapter and a channel according to the present disclosure.

FIG. 1 is a flowchart of a binding and configuration method for a bus adapter and a channel according to the present disclosure.

As shown in FIG. 1, Embodiment 1 provides a binding and configuration method for a bus adapter and a channel, including: configuring a mapping table of a mapping manager; associating a logical channel with a corresponding hardware channel based on the mapping table; and connecting the logical channel to the corresponding hardware channel for data communication. A common architecture for the application program to access bus adapter resources is realized. The application programs using this architecture can arbitrarily configure the bus adapter model and the hardware channel that need to be connected, and the mapping relationship takes effect immediately after each configuration change without modifying the user's software, thus improving the efficiency of the application program development and reducing the possibility of errors.

Figure 2:
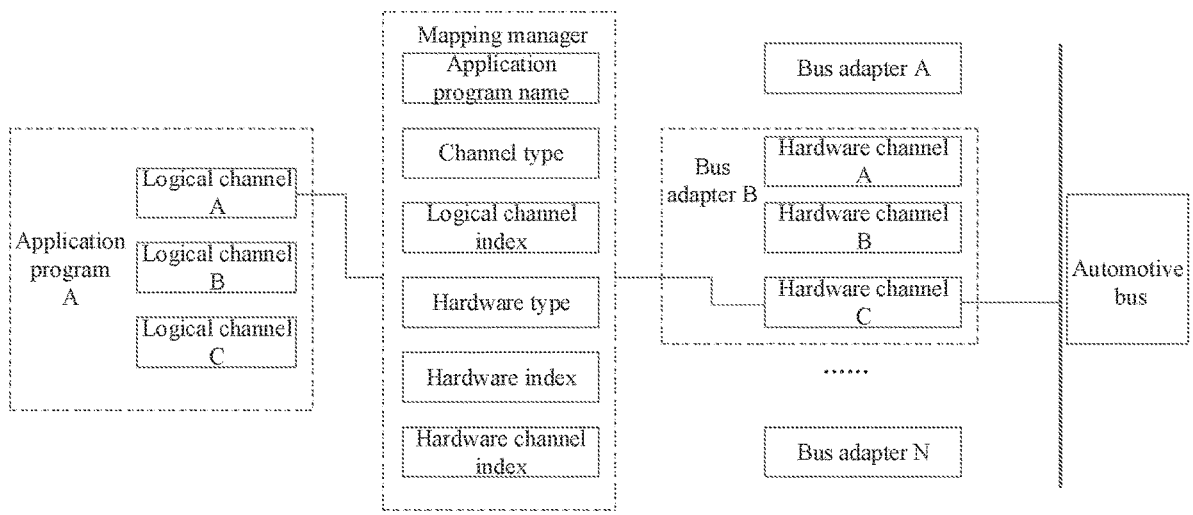
FIG. 2 is a schematic diagram of a bus adapter and channel binding and configuration according to the present disclosure.

FIG. 2 is a schematic diagram of a bus adapter and channel binding and configuration according to the present disclosure.

In this embodiment, a method for configuring the mapping table of the mapping manager is explained with reference to FIG. 2. The mapping manager is responsible for associating each logical channel with a hardware channel of a bus adapter. Each association is implemented by using the mapping table described by the mapping manager. Each mapping table includes six information fields, and all mapping tables constitute a mapping network between potential application programs in the computer and potential bus adapters. A mapping table can be arbitrarily added to or deleted from the mapping manager by a user, and the six information fields in the mapping table can be arbitrarily configured. The six information fields in the mapping table include an application program name, a channel type, a logical channel index, a hardware type, a hardware index, and a hardware channel index. The application program includes single or multiple logical channels for each supported type of automotive bus. The number and type of the logical channels are configured by the user (for example, the user can configure the number and type of the logical channels through corresponding software). For example, application program A supports the CAN bus and includes three logical channels, and a mapping target corresponding to each logical channel is managed by the mapping manager. The mapping manager associates each logical channel with a hardware channel of the bus adapter based on the mapping table. A common architecture for the application program to access bus adapter resources is realized. The application programs using this architecture can arbitrarily configure the bus adapter model and the hardware channel that need to be connected. Problems caused by replacing the bus adapter and connecting the bus adapters to the computer device one after another can be resolved by modifying software configuration rather than the software, thereby avoiding extra development investment and ensuring software reliability.

In this embodiment, the application program name is a string name of the application program using the mapping manager, such as application program A. The channel type is a type of the logical channel that the mapping manager is responsible for mapping, for example, a logical channel A of application program A is a CAN bus. The logical channel index is a logical channel resource number of the application program, and the number increases from small to large. The logical channel index is obtained by numbering the logical channel, the index value is the numbering order, and the index value is incremented from small to large. If there are three logical channels, their indexes are 0, 1, and 2 respectively. The hardware type is a type of manufacturer of the corresponding bus adapter and a model of the bus adapter of the manufacturer. The hardware index is a number of distinguishing a hardware of the same type after the corresponding bus adapter is inserted into a computer device, and the number in the computer device is dynamically adjusted based on an SN ordering method of the bus adapter. The hardware channel index is a number of hardware channels of the same type in the corresponding bus adapter, and the number is preset in the same bus adapter, for example, a hardware channel A of a bus adapter A.

FIG. 3 is a schematic diagram of a hardware index sorting method of bus adapters according to the present disclosure.

As shown in FIG. 3, in this embodiment, the hardware index is obtained by sorting SNs of bus adapters in ascending order, and after the SNs of the bus adapters are sorted in ascending order, a bus adapter with the smallest SN has the lowest hardware index. The hardware index is obtained by sorting SNs of the bus adapters in ascending order, and the sorting method is based on string comparison. The SNs of the bus adapters are read from the API interface provided by the manufacturer of the bus adapters. For example, a total of N bus adapters of the same type from the same manufacturer are inserted into the computer device, and the SNs of the bus adapters are different. After the SNs are sorted in ascending order, the bus adapter with the smallest SN (SN=000001) has the lowest hardware index, the bus adapter with the second-smallest SN (SN=000123) has the second-lowest hardware index, and so on.

In this embodiment, a method for associating the logical channel with the corresponding hardware channel based on the mapping table includes associating each logical channel with a hardware channel of the corresponding bus adapter based on the mapping table.

In this embodiment, a method for connecting the logical channel to the corresponding hardware channel for data communication includes: When the application program connects to the bus adapter, all supported bus adapters inserted into the computer device are scanned, and then all mapping tables in the mapping manager are searched for the mapping table associated with the application program based on the application program name. Corresponding hardware is searched based on a hardware type, a hardware index and a hardware channel index in a mapping table corresponding to each logical channel associated with the application program. If the corresponding hardware exists, the corresponding bus adapter is initialized, and a data transceiver function of the logical channel is connected to the hardware channel of the corresponding bus adapter for data communication. Otherwise, the connection is determined to fail. A common architecture for the application program to access bus adapter resources is realized. The application programs using this architecture can arbitrarily configure the bus adapter model and the hardware channel that need to be connected, and the mapping relationship takes effect immediately after each configuration change without modifying the user's software, thus improving the efficiency of the application program development and reducing the possibility of errors. In addition, the user's application program can access without any difference in channel resources of automotive bus adapters produced by different manufacturers, and changing the bus adapter or hardware channel in an application process only requires modification of the configuration rather than the software. The user can achieve twice the result with half the effort by choosing this method when developing the application program.

Embodiment 2

FIG. 4 is a principle block diagram of a binding and configuration system for a bus adapter and a channel according to the present disclosure.

As shown in FIG. 4, based on Embodiment 1, Embodiment 2 further provides a binding and configuration system for a bus adapter and a channel, including a mapping table configuration module configured to configure a mapping table of a mapping manager, an association module configured to associate a logical channel with a corresponding hardware channel based on the mapping table, and a connection module configured to connect the logical channel to the corresponding hardware channel for data communication. A common architecture for the application program to access bus adapter resources is realized. The application programs using this architecture can arbitrarily configure the bus adapter model and the hardware channel that need to be connected, and the mapping relationship takes effect immediately after each configuration change without modifying the user's software, thus improving the efficiency of the application program development and reducing the possibility of errors. In addition, the user's application program can access without any difference in channel resources of automotive bus adapters produced by different manufacturers, and changing the bus adapter or hardware channel in an application process only requires modification of the configuration rather than the software. The user can achieve twice the result with half the effort by choosing this method when developing the application program.

In this embodiment, the mapping table configuration module configures the mapping table of the mapping manager, the association module associates the logical channel with the corresponding hardware channel based on the mapping table, and the connection module connects the logical channel to the corresponding hardware channel for data communication. Details have been described in Embodiment 1 and are not to be repeated in this embodiment.

Embodiment 3

Based on Embodiment 1, Embodiment 3 further provides a mapping manager, and the mapping manager is configured to associate a logical channel with a hardware channel. A common architecture for the application program to access bus adapter resources is realized. The application programs using this architecture can arbitrarily configure the bus adapter model and the hardware channel that need to be connected, and the mapping relationship takes effect immediately after each configuration change without modifying the user's software, thus improving the efficiency of the application program development and reducing the possibility of errors.

In this embodiment, a method for associating the logical channel with the hardware channel is implemented by using the binding and configuration method for a bus adapter and a channel in Embodiment 1.

Embodiment 4

Figure 5:
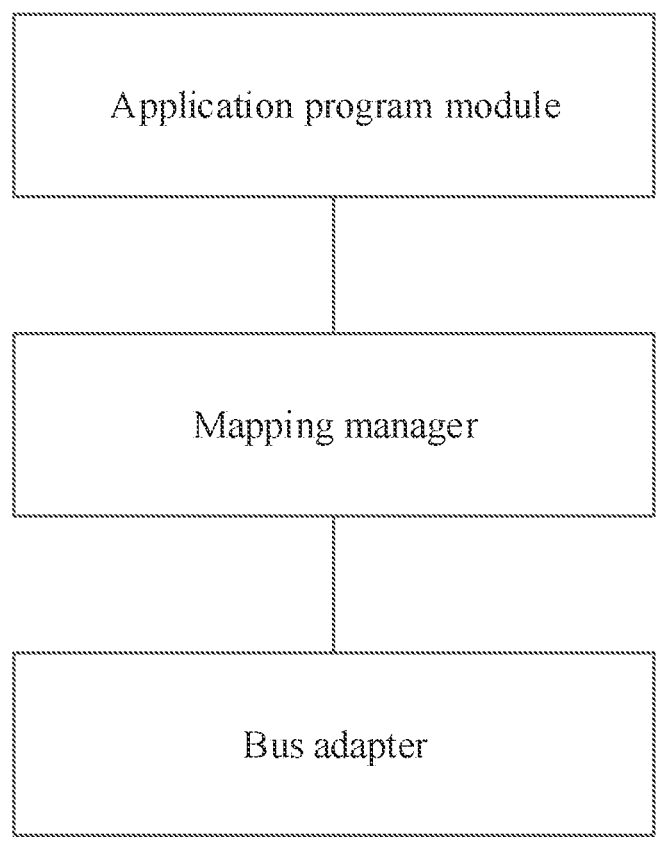
FIG. 5 is a principle block diagram of a bus adapter connection system according to the present disclosure.

FIG. 5 is a principle block diagram of a bus adapter connection system according to the present disclosure.

As shown in FIG. 5, based on Embodiment 3, Embodiment 4 further provides a bus adapter connection system, including an application program module (a module provided with an application program), a mapping manager, and a bus adapter. The mapping manager is configured to associate and then connect each logical channel in the application program module with a hardware channel of the bus adapter for data communication. The user's application program can access without any difference in channel resources of automotive bus adapters produced by different manufacturers, and changing the bus adapter or hardware channel in an application process only requires modification of the configuration rather than the software. The user can achieve twice the result with half the effort by choosing this method when developing the application program.

In this embodiment, the application program module may include single or multiple logical channels, and the bus adapter may include single or multiple hardware channels.

In this embodiment, the application program module, the mapping manager, and the bus adapter are configured to associate and then connect each logical channel and a hardware channel of the bus adapter for data communication according to the binding and configuration method for a bus adapter and a channel in Embodiment 1.

In summary, in the present disclosure, the mapping table of the mapping manager is configured, the logical channel is associated with the corresponding hardware channel based on the mapping table, and the logical channel is connected to the corresponding hardware channel for data communication. A common architecture for the application program to access bus adapter resources is realized. The application programs using this architecture can arbitrarily configure the bus adapter model and the hardware channel that need to be connected, and the mapping relationship takes effect immediately after each configuration change without modifying the user's software, thus improving the efficiency of the application program development and reducing the possibility of errors.

In several embodiments provided in the present disclosure, it should be understood that the disclosed device and system may be implemented in other manners. The device embodiments described above are merely examples. For example, the flowcharts and block diagrams in the accompanying drawings show the possible implementation architecture, functions, and operations of the devices, methods, and computer program products according to multiple embodiments of the present disclosure. Each block in the flowcharts or block diagrams may represent a module, a program segment, or a part of code, and the module, the program segment, or the part of code contains one or more executable instructions used to implement specified logical functions. It should also be noted that, in some alternative implementations, the functions marked in the blocks may alternatively occur in a different order from that marked in the drawings. For example, two consecutive blocks can actually be executed in parallel, or sometimes can be executed in the reverse order, depending on the functions involved. It should also be noted that each block in the flowcharts and/or block diagrams and combinations of the blocks in the flowcharts and/or block diagrams may be implemented by a dedicated hardware-based system for executing specified functions or operations or may be implemented by a combination of dedicated hardware and computer instructions.

In addition, all functional modules in the embodiments of the present disclosure may be integrated into one independent part, or each of the modules may exist alone physically, or two or more modules may be integrated into one independent part.

The functions, if implemented in the form of a software functional module and sold or used as a stand-alone product, may be stored in a computer-readable storage medium. Based on such understanding, the technical solutions of the present disclosure essentially or the part contributing to the prior art may be implemented in the form of a software product. The computer software product may be stored in a storage medium, and includes several instructions for enabling a computer device (which may be a personal computer, a server, a network device, or the like) to perform all or some steps of the methods described in the embodiments of the present disclosure. The storage medium includes any medium that can store program code, such as a universal serial bus (USB) flash disk, a mobile hard disk, a read-only memory (ROM), a random access memory (RAM), a magnetic disk, or an optical disk.

Under the inspiration of the above ideal examples of the present disclosure, a skilled person can absolutely make various changes and modifications through the above description content without departing from the scope of the technical idea of the present disclosure. The technical scope of the present disclosure is not limited to the content of the description, which must be determined according to the scope of the claims.

What is claimed is:

1. A binding and configuration method for a bus adapter and a channel, comprising:
   configuring a mapping table of a mapping manager;
   associating a logical channel with a corresponding hardware channel based on the mapping table; and
   connecting the logical channel to the corresponding hardware channel for data communication;
   wherein the configuring of the mapping table of the mapping manager comprises:
   configuring six information fields in the mapping table, wherein the six information fields in the mapping table comprise an application program name, a channel type, a logical channel index, a hardware type, a hardware index, and a hardware channel index; wherein
   the application program name is a string name of an application program using the mapping manager;
   the channel type is a type of a logical channel that the mapping manager is responsible for mapping;
   the logical channel index is a logical channel resource number of the application program;
   the hardware type is a type of a manufacturer of a corresponding bus adapter and a model of the corresponding bus adapter of the manufacturer;
   the hardware index is a number for identifying hardware of a same type after the corresponding bus adapter is inserted; and
   the hardware channel index is a number of hardware channels of a same type in the corresponding bus adapter.

2. The binding and configuration method according to claim 1, wherein
   the logical channel index is the logical channel resource number of the application program, wherein the numbers increase from small to large.

3. The binding and configuration method according to claim 1,
   wherein the number for identifying the hardware of the same type after the corresponding bus adapter is inserted is dynamically adjusted based on a serial number (SN) ordering method of the corresponding bus adapters.

4. The binding and configuration method according to claim 1, wherein
   the hardware channel index is preset in the corresponding bus adapter.

5. The binding and configuration method according to claim 1, wherein
   the hardware index is obtained by sorting SNs of bus adapters in an ascending order, and after the SNs of the bus adapters are sorted in the ascending order, a bus adapter with a smallest SN has a lowest hardware index.

6. The binding and configuration method according to claim 1, wherein
   a method for associating the logical channel with the corresponding hardware channel based on the mapping table comprises:
   associating each logical channel with a hardware channel of a corresponding bus adapter based on the mapping table.

7. The binding and configuration method according to claim 1, wherein
   a method for connecting the logical channel to the corresponding hardware channel for data communication comprises:
   scanning all supported bus adapters when an application program connects to a corresponding bus adapter, and searching all mapping tables in the mapping manager for the mapping table associated with the application program based on an application program name;
   searching for a corresponding hardware based on a hardware type, a hardware index and a hardware channel index in a mapping table corresponding to each logical channel associated with the application program; and
   when the corresponding hardware exists, initializing the corresponding bus adapter, and connecting a data transceiver function of the logical channel to the hardware channel of the corresponding bus adapter for data communication; when the corresponding hardware does not exist, determining that the connection fails.

8. A connection method for a bus adapter and a computer device, wherein
   the computer device is configured to execute programs of the binding and configuration method according to claim 1, and perform data communication with the corresponding bus adapter.

9. A binding and configuration system for a bus adapter and a channel, comprising:
   a computer device, configured to comprise:
   a mapping table configuration module configured to configure a mapping table of a mapping manager;

an association module configured to associate a logical channel with a corresponding hardware channel based on the mapping table; and a connection module configured to connect the logical channel to the corresponding hardware channel for data communication;

wherein the operation of configuring the mapping table of the mapping manager comprises:

configuring six information fields in the mapping table;

wherein the six information fields in the mapping table comprise an application program name, a channel type, a logical channel index, a hardware type, a hardware index, and a hardware channel index;

the application program name is a string name of an application program using the mapping manager;

the channel type is a type of a logical channel that the mapping manager is responsible for mapping;

the logical channel index is a logical channel resource number of the application program;

the hardware type is a type of a manufacturer of a corresponding bus adapter and a model of the corresponding bus adapter of the manufacturer;

the hardware index is a number for identifying hardware of a same type after the corresponding bus adapter is inserted; and the hardware channel index is a number of hardware channels of a same type in the corresponding bus adapter.

10. The binding and configuration system according to claim 9, wherein the operation of connecting the logical channel to the corresponding hardware channel for data communication comprises:

scanning all supported bus adapters when an application program connects to the corresponding bus adapter, and searching all mapping tables in the mapping manager for the mapping table associated with the application program based on an application program name;

searching for a corresponding hardware based on a hardware type, a hardware index and a hardware channel index in a mapping table corresponding to each logical channel associated with the application program; and when the corresponding hardware exists, initializing the corresponding bus adapter, and connecting a data transceiver function of the logical channel to the hardware channel of the corresponding bus adapter for data communication; when the corresponding hardware does not exist, determining that the connection fails.

11. A mapping manager, comprising a computer device, wherein the computer device is configured to execute programs of the binding and configuration method according to claim 1, wherein the mapping manager associates the logical channel with the hardware channel.

12. A bus adapter connection system, comprising:

a computer device and at least one bus adapter, wherein the computer device is configured to comprise an application program module and a mapping manager, wherein the computer device is configured to execute programs of the binding and configuration method according to claim 1 to associate and connect each logical channel in the application program module with the hardware channel of the corresponding bus adapter for data communication.

13. The bus adapter connection system according to claim 12, wherein the at least one bus adapter has at least one hardware channel.

14. The bus adapter connection system according to claim 12, wherein a module of an application program has at least one logical channel.

15. A bus adapter, configured to communicate with the computer device performing the binding and configuration method according to claim 1.

16. The bus adapter according to claim 15, wherein the hardware channel index is carried in the bus adapter.

17. The bus adapter according to claim 16, wherein the bus adapter communicates with the computer device through a CAN bus.

18. The bus adapter according to claim 16, wherein the bus adapter has at least one hardware channel.

* * * * *